United States Patent Office 2,815,353
Patented Dec. 3, 1957

2,815,353

Δ8(14)-PREGNENES AND PROCESS

Josef Fried, New Brunswick, N. J.

No Drawing. Application September 4, 1956,
Serial No. 607,585

8 Claims. (Cl. 260—397.45)

This invention relates to the synthesis of steroids and has for its objects the provision of: (I) an advantageous process of preparing steroids of the general formula

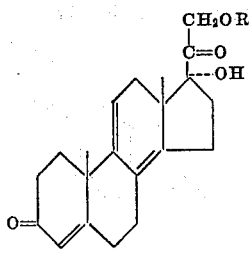

wherein R is hydrogen or acyl (particularly the acyl radical of a hydrocarbon carboxylic acid having less than ten carbon atoms as exemplified by the lower fatty acids, benzoic acid, etc.); (II) these new steroids, which are useful in themselves as physiologically active steroids; and (III) new steroids of the general formula

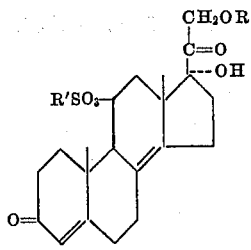

wherein R is as above-defined, and R' is a hydrocarbon radical of less than eight carbon atoms (e. g., lower alkyl, such as methyl, and monocyclic aryl, such as telyl).

The process of this invention essentially comprises interacting a 21-ester of $\Delta^{4,8(14)}$-pregnadiene-11$\beta$,17$\alpha$,21-triol-3,20-dione with a sulfonyl halide of the formula R'SO$_2$X, wherein X is halogen, in an organic base (e. g., pyridine) in the cold (i. e., a temperature below room temperature and optimally at about 0° C.) to yield the corresponding 11$\beta$-sulfonyloxy derivative, and then heating this 11$\beta$-sulfonyloxy derivative with a base, such as an aromatic tertiary nitrogenous base (e. g., pyridine or collidine) or an alkali metal salt of a lower fatty acid (e. g., sodium acetate in acetic acid) to obtain the desired $\Delta^{4,8(14),9(11)}$-pregnatriene-17$\alpha$,21-diol-3,20-dione 21-ester, which can then be saponified in the usual manner, as by treatment with potassium carbonate in methanol, to yield the free $\Delta^{4,8(14),9(11)}$-pregnatriene-17$\alpha$,21-diol-3,20-dione.

The pregnatrienes of this invention are physiologically active steroids which possess mineralocorticoid activity. Thus, these new steroids of this invention can be administered instead of, and in the same manner as, desoxycorticosterone in the treatment of Addison's disease. The dosage for such administration is, of course, dependent on the relative activity of the particular steroid.

The following examples are illustrative of the invention (all temperatures being in centigrade):

EXAMPLE 1

$\Delta^{4,8(14)}$ - pregnadiene-11$\beta$,17$\alpha$,21-triol-3,20-dione 11$\beta$-mesylate 21-acetate A solution of 51 mg. of $\Delta^{4,8(14)}$-pregnadiene-11$\beta$,17$\alpha$,21-triol-3,20-dione 21-acetate (prepared as disclosed in U. S. applications of Josef Fried, Serial No. 417,489, filed March 10, 1954, and Serial No. 607,586, filed on even date herewith) in 3 ml. of pyridine and 0.02 ml. of methanesulfonyl chloride is allowed to stand at 0° for 18 hours. The mixture is then diluted with water and extracted with chloroform. The chloroform extract is washed with water, dilute acid and again with water, dried over sodium sulfate and evaporated to dryness in vacuo. Recrystallization of the resulting residue from 95% alcohol gives the pure mesylate of the following properties: M. P. about 151–152° (dec.); $[\alpha]_D^{23}$ +268° (c., 0.54 in CHCl$_3$), +245° (c., 0.35 in 95% alcohol);

$\lambda_{max.}^{alc.}$ 237 m$\mu$ (17,800); $\lambda_{max.}^{Nujol}$ 3.06, 5.72, 5.81, 6.11$\mu$ Analysis.—Calcd. for C$_{24}$H$_{32}$O$_8$S (480.50): C, 59.98; H, 6.71; S, 6.67. Found: C, 60.01; H, 6.73; S, 6.38.

In a similar manner, by substituting an equivalent amount of ethanesulfonyl chloride or propanesulfonyl chloride for the methanesulfonyl chloride in the procedure of Example 1, the 11$\beta$-ethanesulfonyloxy and 11$\beta$-propanesulfonyloxy derivatives are formed, respectively.

EXAMPLE 2

$\Delta^{4,8(14)}$-pregnadiene-11$\beta$,17$\alpha$,21-triol-3,20-dione 11$\beta$-tosylate 21-acetate A solution of 50 mg. of $\Delta^{4,8(14)}$-pregnadiene-11$\beta$,17$\alpha$,21-triol-3,20-dione 21-acetate in 2 ml. of pyridine and 50 mg. of p-toluene-sulfonyl chloride is allowed to stand at 0° for 18 hours. The mixture is then diluted with water and extracted with chloroform. The chloroform extract is washed with water, dilute acid and again with water, dried over sodium sulfate and evaporated to dryness in vacuo. Recrystallization of the resulting residue from 95% alcohol gives the pure tosylate.

EXAMPLE 3

$\Delta^{4,8(14),9(11)}$-pregnatriene-17$\alpha$,21-diol - 3,20 - dione 21-acetate A solution of 50 mg. of the mesylate prepared in Example 1 in 4 ml. of pyridine is refluxed for one hour. The steroids are isolated by extraction with chloroform and the resulting material (about 45 mg.) recrystallized from 95% ethanol. The resulting triene (about 16 mg.) melts at about 183–185° (dec.); $[\alpha]_D^{23}$ +129° (c., 0.42 in chloroform);

$\lambda_{max.}^{alc.}$ 240 m$\mu$ ($\epsilon$=17,400) shoulder at 275 m$\mu$ ($\epsilon$=3,700);
$\lambda_{max.}^{Nujol}$ 3.12, 5.80, 6.05, 6.20$\mu$ Analysis.—Calcd. for C$_{23}$H$_{28}$O$_5$ (384.45): C, 71.85; H, 7.36. Found: C, 71.63; H, 7.37.

The triene can also be obtained by replacing the pyridine by a solution of sodium acetate in glacial acetic acid. Similarly, if the tosylate of Example 2 is substituted for the mesylate, the same triene is obtained.

The 21-acetate formed in Example 3 can be hydrolyzed by treatment with potassium carbonate in methanol to yield the free 21-hydroxy derivative, which in turn can be esterified in the usual manner as by treatment with a suitable acid anhydride (e. g., propionic anhydride) or acyl halide (e. g., benzoyl chloride) in an organic base (e. g., pyridine) to yield the corresponding 21-ester derivative.

The invention may be otherwise variously embodied within the scope of the appended claims.

I claim:
1. A steroid of the general formula

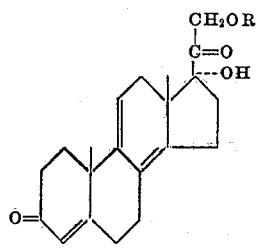

wherein R is selected from the group consisting of hydrogen and the acyl radical of a hydrocarbon carboxylic acid having less than ten carbon atoms.

2. $\Delta^{4,8(14),9(11)}$-pregnatriene-17$\alpha$,21-diol-3,20-dione 21-acetate.

3. A steroid of the general formula

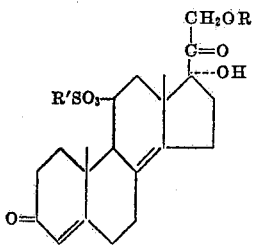

wherein R is selected from the group consisting of hydrogen and the acyl radical of a hydrocarbon carboxylic acid having less than ten carbon atoms, and R' is a hydrocarbon radical of less than eight carbon atoms.

4. $\Delta^{4,8(14)}$-pregnadiene-11$\beta$,17$\alpha$,21-triol-3,20-dione 11$\beta$-mesylate 21-acetate.

5. A process for preparing a compound of the general formula

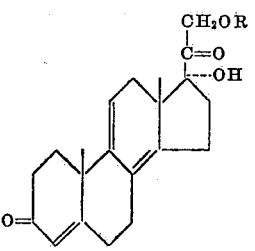

wherein R is selected from the group consisting of hydrogen and the acyl radical of a hydrocarbon carboxylic acid having less than ten carbon atoms, which comprises heating a steroid of the general formula

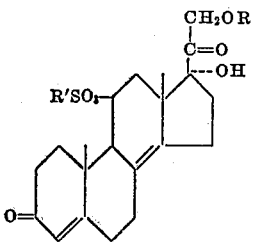

wherein R is as above-defined, and R' is a hydrocarbon radical of less than eight carbon atoms, with a base.

6. The process of claim 5 wherein the steroid reactant is $\Delta^{4,8(14)}$-pregnadiene-11$\beta$,17$\alpha$,21-triol-3,20-dione 11$\beta$-mesylate 21-acetate.

7. A process for preparing a compound of the general formula

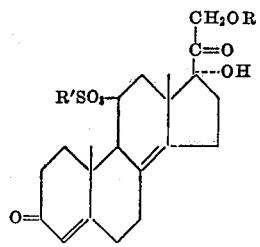

wherein R is selected from the group consisting of hydrogen and the acyl radical of a hydrocarbon carboxylic acid having less than ten carbon atoms, and R' is a hydrocarbon radical of less than eight carbon atoms, which comprises interacting a steroid of the formula

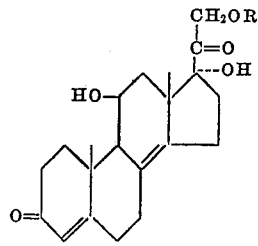

wherein R is as above-defined, with a sulfonyl halide of the general formula R'SO$_2$X, wherein R' is as above-defined and X is halogen.

8. The process of claim 7, wherein the steroid reactant is $\Delta^{4,8(14)}$-pregnadiene-11$\beta$,17$\alpha$,21-triol-3,20-dione 21-acetate, and the sulfonyl halide is mesyl chloride.

No references cited.